(12) United States Patent
Jones

(10) Patent No.: US 9,471,628 B2
(45) Date of Patent: Oct. 18, 2016

(54) METHODS AND SYSTEMS FOR CALCULATING AND RETRIEVING ANALYTIC DATA

(71) Applicant: MasterCard International Incorporated, Purchase, NY (US)

(72) Inventor: William C. Jones, O'Fallon, IL (US)

(73) Assignee: MasterCard International Incorporated, Purchase, NY (US)

( * ) Notice: Subject to any disclaimer, the term of this patent is extended or adjusted under 35 U.S.C. 154(b) by 292 days.

(21) Appl. No.: 13/784,394

(22) Filed: Mar. 4, 2013

(65) Prior Publication Data

US 2014/0250054 A1    Sep. 4, 2014

(51) Int. Cl.
| | | |
|---|---|---|
| *G06F 7/00* | (2006.01) | |
| *G06F 17/00* | (2006.01) | |
| *G06F 17/30* | (2006.01) | |
| *G06Q 10/06* | (2012.01) | |
| *G06Q 20/22* | (2012.01) | |
| *G06F 15/16* | (2006.01) | |

(52) U.S. Cl.
CPC ... *G06F 17/30424* (2013.01); *G06F 17/30563* (2013.01); *G06Q 10/0637* (2013.01); *G06Q 20/22* (2013.01)

(58) Field of Classification Search
CPC .............. G06F 17/30424; G06F 17/30563
USPC .................................. 707/769, 602
See application file for complete search history.

(56) References Cited

U.S. PATENT DOCUMENTS

| | | | |
|---|---|---|---|
| 6,385,604 B1 | 5/2002 | Bakalash et al. | |
| 6,408,292 B1 | 6/2002 | Bakalash et al. | |
| 6,434,544 B1 | 8/2002 | Bakalash et al. | |
| 6,438,538 B1 | 8/2002 | Goldring | |
| 6,473,762 B1 * | 10/2002 | Knoblock et al. | 707/999.01 |
| 6,662,174 B2 | 12/2003 | Shah et al. | |
| 7,031,953 B2 | 4/2006 | Shah et al. | |
| 7,269,579 B2 * | 9/2007 | Lovegren | 707/999.01 |
| 7,315,849 B2 | 1/2008 | Bakalash et al. | |

(Continued)

OTHER PUBLICATIONS

James Bradley. Introduction to Data Base Management in Business (Second Edition). Holt, Rhinehart & Winston, New York, 1987, Chapters 1, 6, the "SQL Retrievals Involving Computations" part of Section 8.2 and Section 8.3, pp. 1-11, 183-220 and 313-325.*

(Continued)

*Primary Examiner* — Usmaan Saeed
*Assistant Examiner* — Brian E. Weinrich
(74) *Attorney, Agent, or Firm* — ArmstrongTeasdale LLP

(57) ABSTRACT

A data management system for calculating and retrieving analytic data involves a computing device coupled to a database. The system includes a plurality of data structures such as database tables. The data structures include a measure data structure including a measure-data element, a collection data structure including a collection-data element, and a fact data structure configured to store a fact-data element including an aggregated value. The aggregated value refers to the result generated by a query computation performed on a transaction database. The system includes a fact-analyzer module configured to generate the aggregated value from the transaction data utilizing the measure-data element and the collection-data element, wherein the measure-data element defines how the aggregated value is calculated. The fact-analyzer module is also configured to store the aggregated value and links to the measure-data element and the collection-data element in the fact-data element.

20 Claims, 11 Drawing Sheets

(56) References Cited

U.S. PATENT DOCUMENTS

| | | | |
|---|---|---|---|
| 7,333,982 B2 | 2/2008 | Bakalash et al. | |
| 7,356,419 B1* | 4/2008 | Culot et al. | 707/999.003 |
| 7,392,248 B2* | 6/2008 | Bakalash et al. | 707/999.005 |
| 7,461,076 B1* | 12/2008 | Weissman et al. | 707/999.102 |
| 7,548,934 B1* | 6/2009 | Platt et al. | 707/999.102 |
| 7,640,320 B2* | 12/2009 | Madison et al. | 707/770 |
| 7,890,546 B2 | 2/2011 | Shah et al. | |
| 7,966,234 B1 | 6/2011 | Merves et al. | |
| 8,041,670 B2 | 10/2011 | Bakalash et al. | |
| 8,170,984 B2 | 5/2012 | Bakalash et al. | |
| 8,195,602 B2 | 6/2012 | Bakalash et al. | |
| 8,321,373 B2 | 11/2012 | Bakalash et al. | |
| 2003/0115194 A1* | 6/2003 | Pitts et al. | 707/999.003 |
| 2003/0229652 A1* | 12/2003 | Bakalash et al. | 707/999.2 |
| 2006/0041660 A1* | 2/2006 | Bishop | H04L 43/0811 709/224 |
| 2007/0156435 A1* | 7/2007 | Greening et al. | 705/1 |
| 2009/0271384 A1* | 10/2009 | Bakalash | G06F 17/30592 707/999.003 |
| 2013/0031126 A1* | 1/2013 | Setlur | 707/769 |

OTHER PUBLICATIONS

James Bradley. Introduction to Data Base Management in Business (Second Edition). Holt, Rhinehart & Winston, New York, 1987, Chapters 1, 6, and Retrieval 10, "The SQL Retrieval Mechanism" and the "SQL Retrievals Involving Computations" parts of Section 8.2 and Section 8.3, pp. 1-11, 183-220 and 306-325.*

* cited by examiner

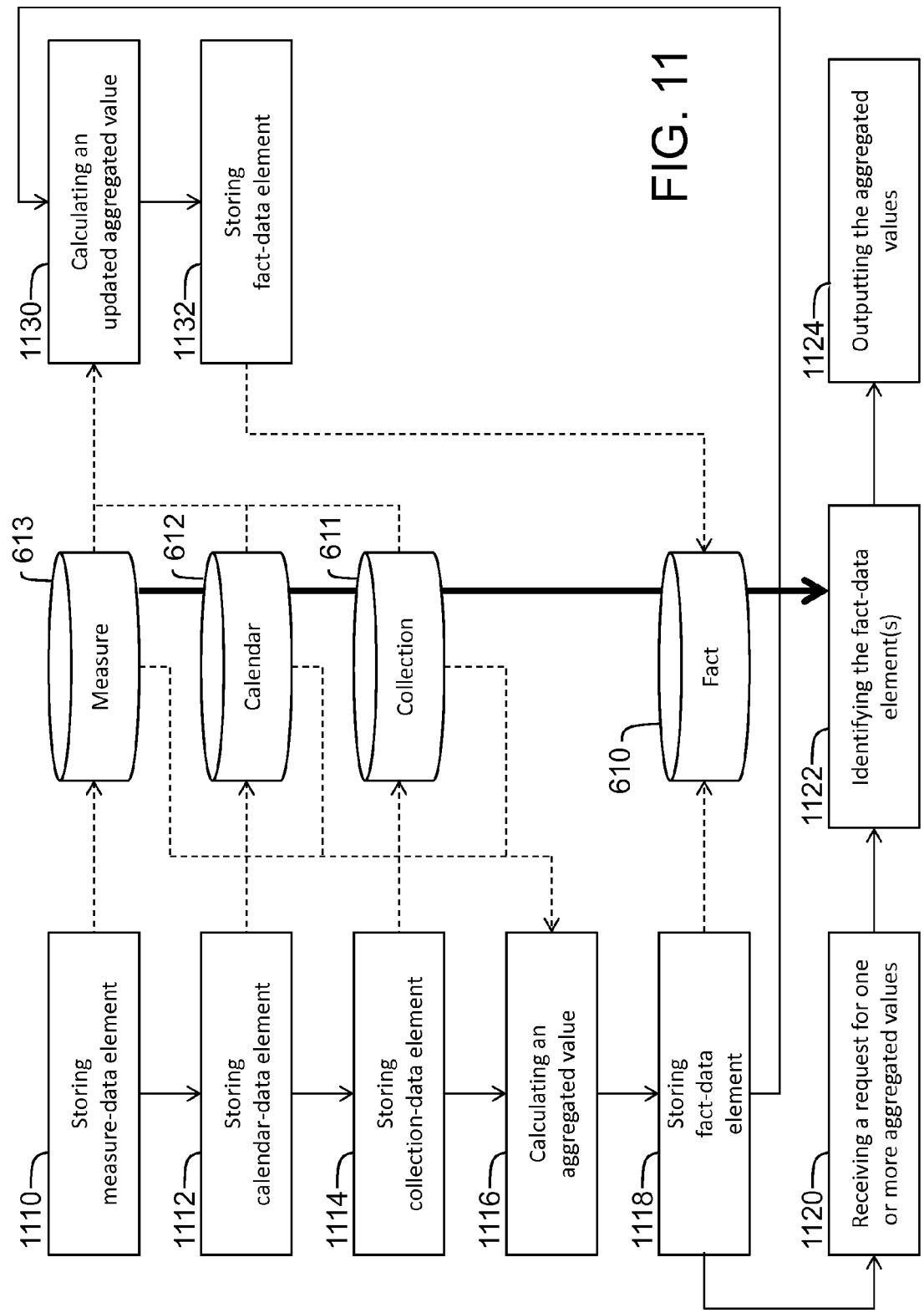

METHODS AND SYSTEMS FOR CALCULATING AND RETRIEVING ANALYTIC DATA

BACKGROUND OF THE INVENTION

This invention relates generally to processing data and, more particularly, to systems and methods for calculating and retrieving analytic data using a body of transactional data managed by a relational database management system (RDBMS).

Transactional data, such as payment card transaction data, is collected and processed routinely by organizations associated with the transactions. Payment card transactions (e.g., credit cards, debit cards, pre-paid cards, gift cards, etc.) may involve a number of parties, including merchants, issuers, cardholders, acquirers, and payment networks. Payment card transactions are so ubiquitous in society today that the volume of data associated with these transactions has grown quite large. The entities tasked with tracking, maintaining, and reporting on these transactions must efficiently process large numbers of transactions daily.

In some cases, interchange networks act as central communication hubs for processing transactional data, providing services to at least some of the parties involved in the payment card transaction. Routinely, payment networks are asked to provide reporting to the customers that they support. For example, an issuer may request that an interchange network provide the issuer with totals from a prior day's transactions. To provide such a service, an analyst associated with the interchange network traditionally must query a large database and generate an aggregated result to return to the analyst. Based on a variety of variables, such as system load, database size, the type of query, and indexing efficiency, the analyst's query may take many seconds or minutes to complete.

Some known systems for increasing efficiency of these aggregation calculations involve creating separate tables of data, sometimes called "aggregate tables." These aggregate tables may store duplicate information, allowing a query to run on a subset of the data rather than a larger database. Other aggregate tables may compute a specific aggregation for each customer and store these values in a separate table. These approaches improve efficiency in certain situations by decreasing the amount of data to search, indexing on a key field tuned for a particular query, or pre-calculating a value. However, each of these approaches requires custom data structures to be built and maintained.

Accordingly, a method and system is needed that enables the payment network to: (i) store pre-calculated aggregation results in a database structure that allows the flexibility to field different types of queries without unnecessarily duplicating data; (ii) structure the database and queries quickly identify and provided the results to a requesting customer; and (iii) facilitate periodic updating of the aggregation results.

BRIEF DESCRIPTION OF THE INVENTION

In one aspect, a data management system for calculating and retrieving analytic data is provided, and involves a computing device coupled to a database including transaction data. The system includes a measure data structure within the database including a measure-data element. The system also includes a collection data structure within the database including a collection-data element. The system further includes a fact data structure within the database. The fact data structure is configured to store a fact-data element. The fact-data element includes an aggregated value, a link to the measure-data element, and a link to the collection-data element. The system also includes a fact-analyzer module. The fact-analyzer module is configured to generate the aggregated value from the transaction data utilizing at least the measure-data element and the collection-data element, wherein the measure-data element defines how the aggregated value is calculated and the collection-data element defines a categorization of the aggregated value. The fact-analyzer module is also configured to store the aggregated value and links to the measure-data element and the collection-data element in the fact-data element.

In another aspect, a method of calculating and retrieving analytic data stored within a computing device in communication with a database is provided. The method includes storing a measure-data element in a measure data structure within the database. The method also includes storing a collection-data element in a collection data structure within the database. The method further includes calculating an aggregated value from the database based at least in part on the measure-data element and the collection-data element, wherein the measure-data element defines how the aggregated value is calculated and the collection-data element defines a categorization of the aggregated value. The method also includes storing the aggregated value and links to the measure-data element and the collection-data element in a fact-data element of a fact data structure.

In yet another aspect, computer-readable storage media having computer-executable instructions embodied thereon is provided. When executed by at least one processor, the computer-executable instructions cause the processor to store a measure-data element in a measure data structure within a database. The computer-executable instructions also cause the processor to store a collection-data element in a collection data structure within the database. The computer-executable instructions further cause the processor to calculate an aggregated value from the database based at least in part on the measure-data element and the collection-data element, wherein the measure-data element defines how the aggregated value is calculated and the collection-data element defines a categorization of the aggregated value. The computer-executable instructions also cause the processor to store the aggregated value and links to the measure-data element and the collection-data element in a fact-data element of a fact data structure.

BRIEF DESCRIPTION OF THE DRAWINGS

FIGS. 1-11 show example embodiments of the methods and systems described herein.

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example analytic system including a plurality of computer devices in accordance with one example embodiment of the present invention.

FIG. 3 is an expanded block diagram of an example embodiment of a server architecture of the system including the plurality of computer devices in accordance with one example embodiment of the present invention.

FIG. 4 illustrates an example configuration of a client system shown in FIGS. 2 and 3.

FIG. 5 illustrates an example configuration of a server system shown in FIGS. 2 and 3.

FIG. 6 is a schematic block diagram of an example transaction database and a set of core data structures used by the system shown in FIG. 2.

FIG. 7 is a schematic block diagram of an example database table structure illustrating the set of core data structures shown in FIG. 6.

FIG. 8 is a detailed schematic block diagram of a first subset of data structures supporting the "Collection" table shown in FIG. 6.

FIG. 9 is a detailed schematic block diagram of a first subset of data structures supporting the "Calendar" table shown in FIG. 6.

FIG. 10 is a detailed schematic block diagram of a first subset of data structures supporting the "Measure" table shown in FIG. 6.

FIG. 11 is a flow diagram of a method for calculating and retrieving analytic data using the analytic system shown in FIG. 2 and the data structures shown in FIGS. 6-10.

DETAILED DESCRIPTION OF THE INVENTION

Figure 1:
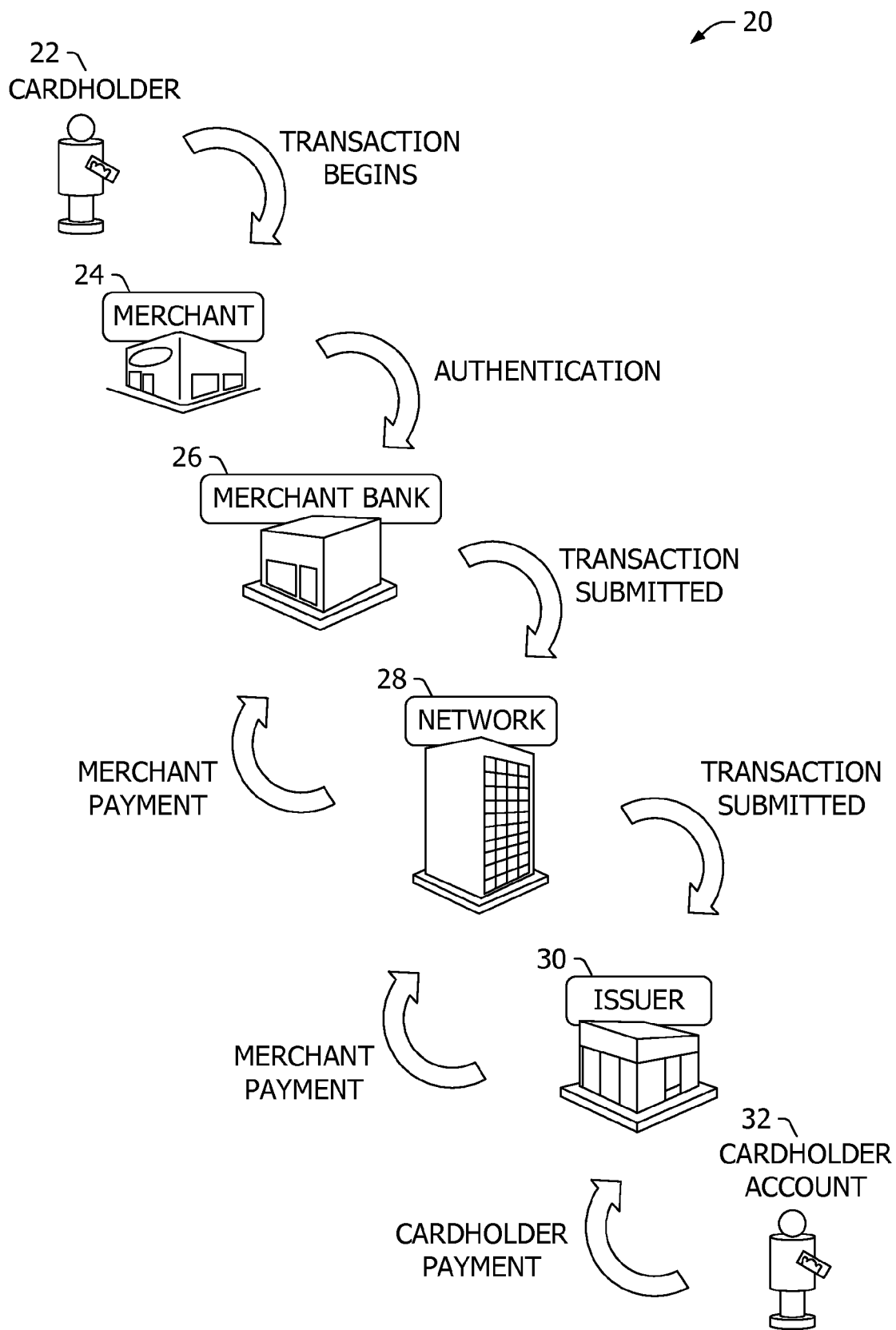

Embodiments of the present invention calculate and stage aggregate data values for users of a transaction-oriented database. The methods and systems described herein facilitate improved access times for users when requesting various aggregate data values associated with their transaction accounts. In one embodiment, common aggregate data values are pre-computed on a routine basis, and stored in a series of flexible database tables organized to facilitate prompt access through a lookup rather than a real-time calculation. The database table organization facilitates flexibility by using supporting tables that generically store and relate parameters associated with many types of data aggregations that users may require. The database system computes aggregate data values from a separate transaction database. The parts necessary to define this computation are stored in the supporting tables and used by the system to compute and store many aggregate data values for many users. The aggregate data values are then stored in a central table, along with links to each of the supporting tables used in the calculation. Because the calculations have been performed prior to the user's request, the only latency the user notices is the time taken to search and return a single row, rather than the time necessary to retrieve and summarize many rows.

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an example multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
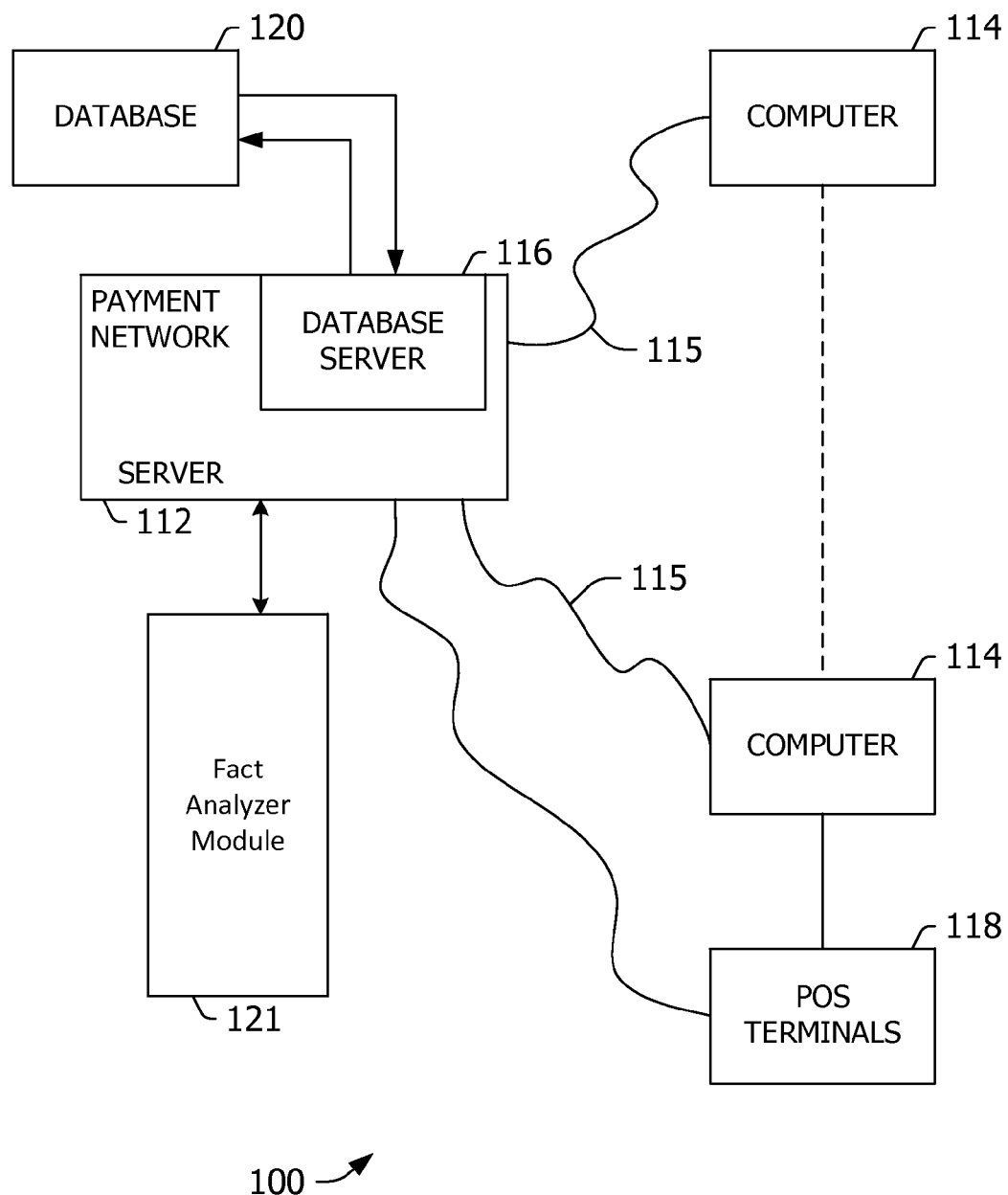

FIG. 2 is a simplified block diagram of an example analytical system 100 including a plurality of computer devices connected in communication in accordance with the present invention. In the example embodiment, system 100 may be used for calculating and retrieving analytic data associated with a financial transaction database.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

System 100 also includes a fact-analyzer module 121 communicatively coupled to server system 112, database server 116, and database 120. The operations of fact-analyzer module 121 are discussed in greater detail below.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, and/or a biller.

Figure 3:
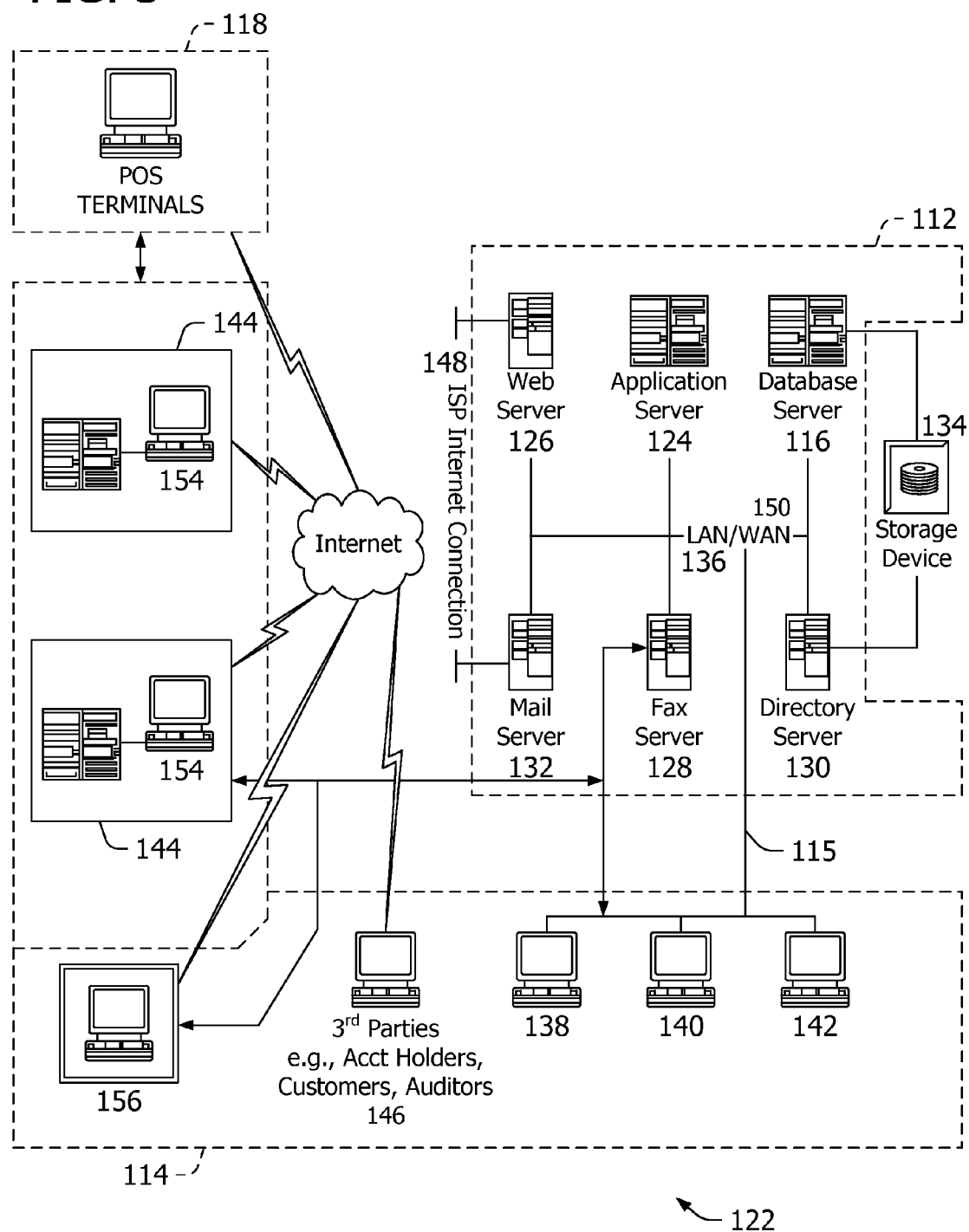

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
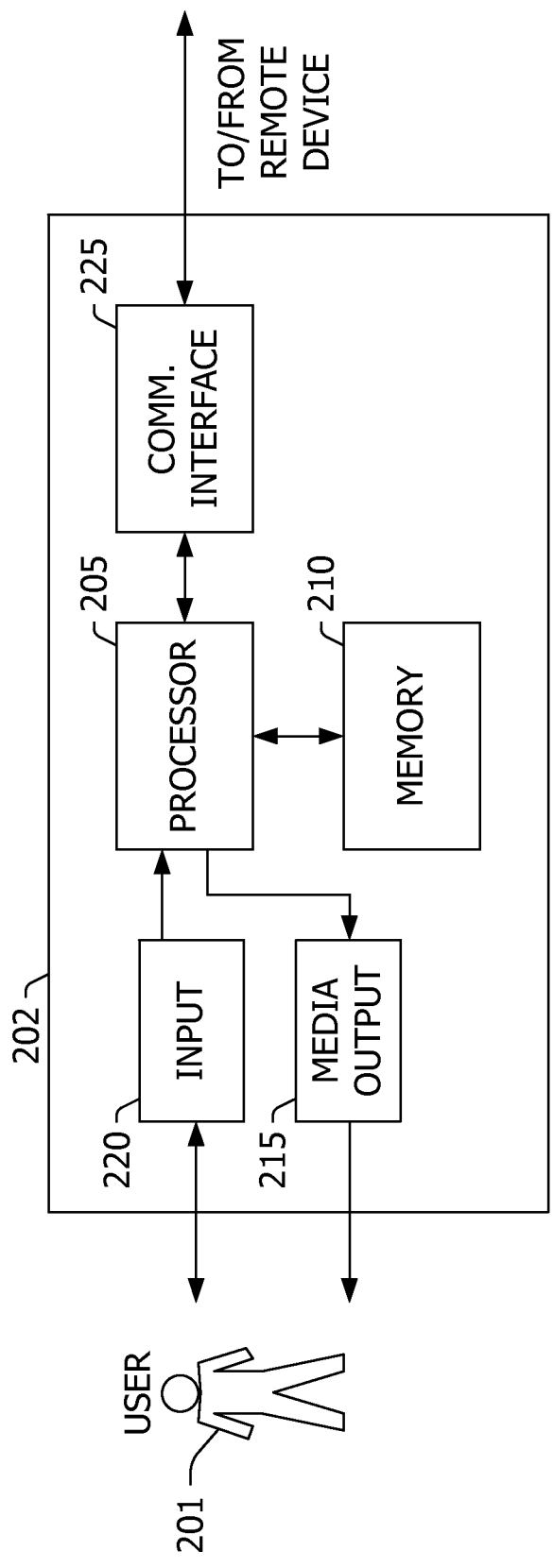

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
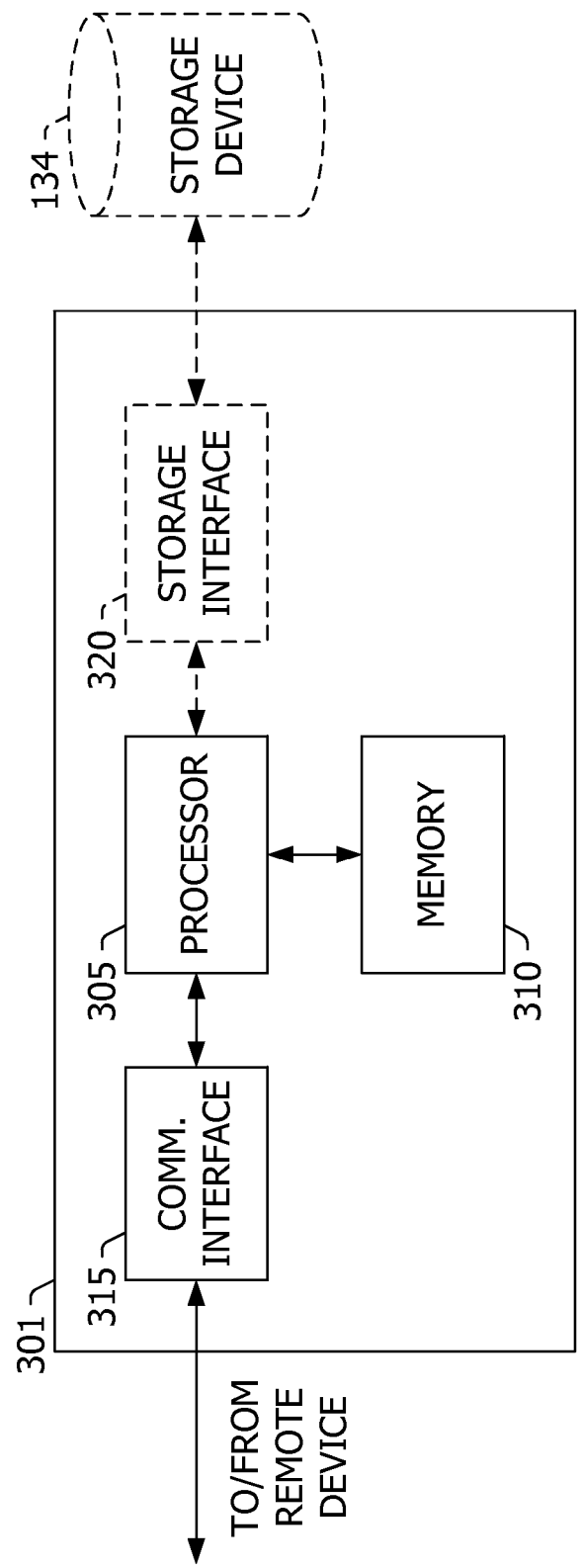

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
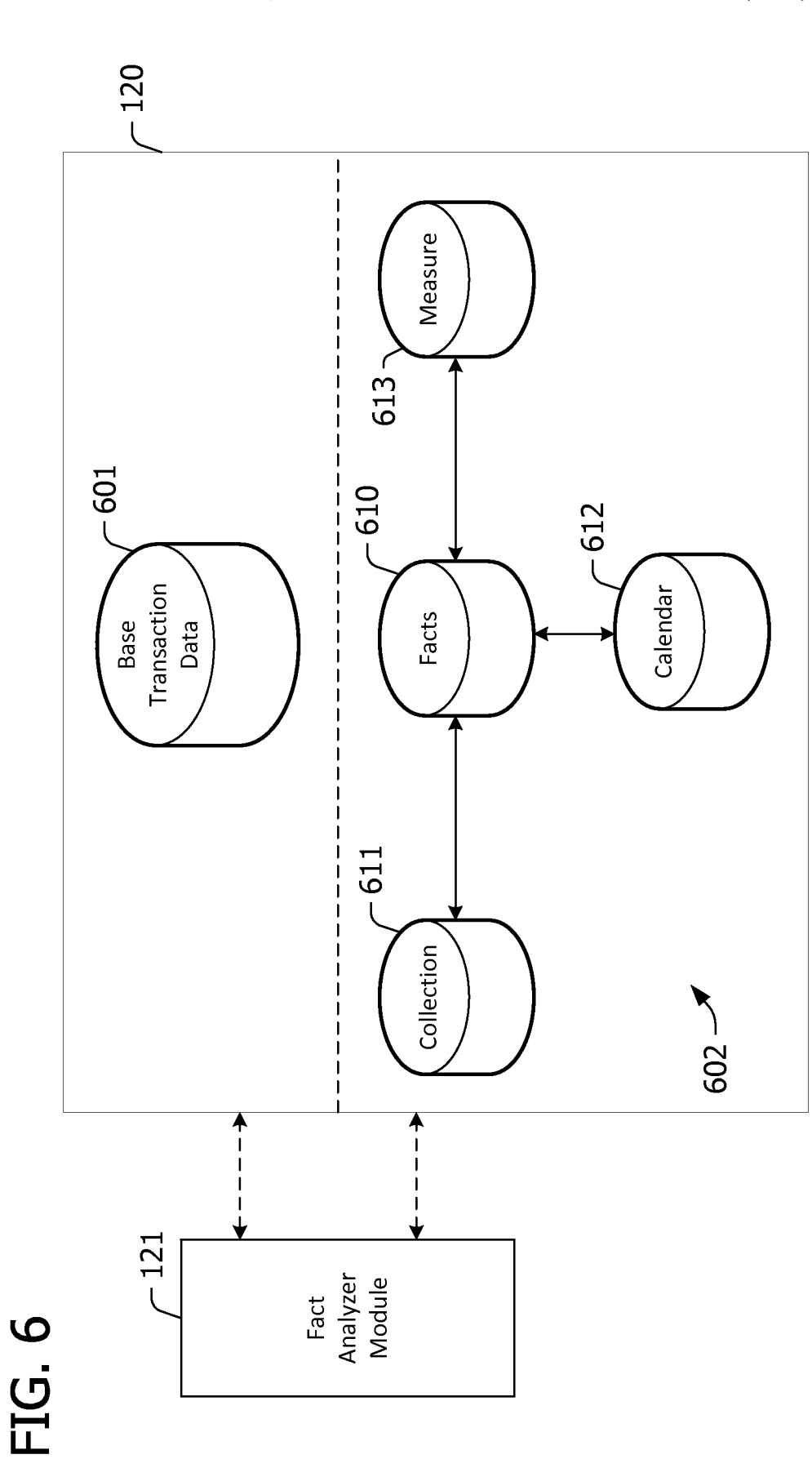

FIG. 6 is a schematic block diagram of an example transaction database 601 and a set of core data structures 602 used by system 100 (shown in FIG. 2). Components in FIG. 6, identical to components of system 100 (shown in FIG. 2), are identified using the same reference numerals as used in FIG. 2. In the example embodiment, core data structures 602 may be used for calculating and retrieving analytic data associated with a financial transaction database, such as transaction database 601.

More specifically, in the example embodiment, database 120 includes transaction database 601 and core data structures 602. Alternatively, transaction database 601 and core data structures 602 may be stored in separate databases running on the same server system 112 (shown in FIG. 2), or a different server system communicatively coupled with database server 116 (shown in FIG. 2). Core data structures 602 includes a plurality of interlinked tables, including a "facts" data structure 610, a "collections" data structure 611, a "calendar" data structure 612, and a "measures" data structure 613. The uses of transaction database 601 and core data structures 602 are described below in greater detail. As used herein, the term "data structure" refers, generally, to an organizational scheme for data. More specifically, the term "data structure", as used herein, may refer to a database table structure commonly used to organize data in traditional RDBMS systems, and/or may refer to a broader or more granular organization of data. In the example embodiment, facts data structure 610, collections data structure 611, calendar data structure 612, and measure data structure 613 are each tables in a single schema within database 120.

Fact-analyzer module 121 is communicatively coupled to server system 112 and database server 116 (shown in FIG. 2). Fact-analyzer module 121 is configured to perform query computations on transaction data 601, and store the results in fact data structure 610. As used herein, the terms "aggregation result", "aggregation value", and "aggregated value" are used interchangeably to refer to the result generated by a query computation performed on transaction database 601. The query computation may be a single query and computation, or may be a series of queries and/or computations, culminating in a single value result. In the example embodiment, fact-analyzer module 121 is a computer program executing instructions on server system 112. Alternatively, fact-analyzer module 121 may execute instructions on any computer system capable of communicatively coupling with server system 112 and database server 116. The operations of fact-analyzer module 121 are discussed in further detail below.

Figure 7:
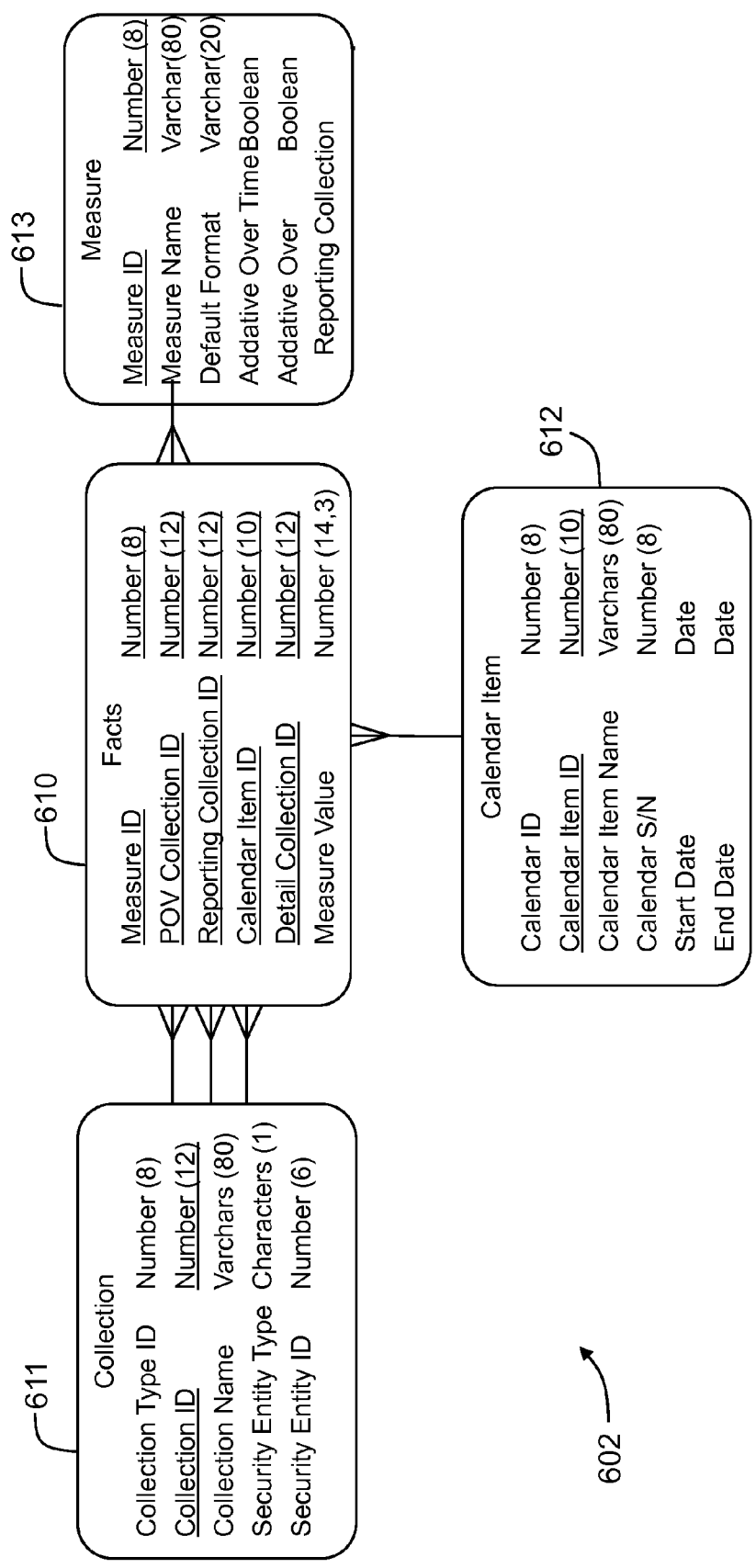

FIG. 7 is a detailed schematic block diagram of the example core data structures 602 shown in FIG. 6. Components in FIG. 7, identical to components shown in FIG. 6, are identified using the same reference numerals as used in FIG. 6. In the example embodiment, fact data structure 610 is surrounded by three supporting tables, including collection data structure 611, calendar data structure 612, and measure data structure 613. Fact data structure 610 includes a plurality of aggregated values computed by fact-analyzer module 121 (shown in FIG. 6). Additionally, each aggregated value includes a link to an element in measure data structure 613, a link to an element in calendar data structure 612, and one or more links to elements in collection data structure 611. These links, and their uses, are described in further detail below. As used herein, the term "link" is used, generally, to refer to any method of referencing another element in a data structure. In the example embodiment, each element in each data structure has a unique identification number within the element's data structure. "Linking" to an element, in the example embodiment, involves referencing the element using its unique identification number. As used herein, the term "index identifier" ("index ID") refers to one of these unique identification numbers. Alternatively, any method of linking to individual elements within a data structure that enables operation of the methods and systems described herein may be used.

Also, as used herein, the term "element" generally refers to a grouping of related data. More specifically, in the example embodiment, an element refers to a row in a database table. For example, when an aggregated value is calculated and stored in fact data structure 610, the aggregated value is stored in an element, or a row, of the database table. Further, each element or row in a database table has associated with it a data structure defining one or more data values that may be stored within it, including data types associated with each of those data values. For example, the fact data structure 610 is a database table having a plurality of elements, or rows, where each row has a structure including a "Measure ID", a "POV Collection ID" ("point of view"), a "Reporting Collection ID", a "Calendar Item ID", a "Detail Collection ID", and a "Measure Value". Each of these fields are of data type "Number." Further, each of these data values within a data structure or table are commonly referred to as a "field" or "column" of the table. The data structure of the table defines the structure of each row within the table. For example, when the aggregated value is stored within an element in fact data structure 210, the aggregated value, more specifically, is stored within a field of the element, in this case the "Measure Value" field.

Within facts data structure 610, the "Measure Value" field is used to store aggregated values of calculations computed by fact-analyzer module 121. All of the other fields shown in the example embodiment represent links to elements in the other three tables. Fact-analyzer module 121 uses each of these links to calculate and/or categorize the particular aggregated value. "Measure ID" is an index ID referencing an element in measure data structure 613 associated with the aggregated value computation. "Calendar Item ID" is an index ID referencing an element in calendar data structure 612 associated with the aggregated value computation. The "POV Collection ID", "Reporting Collection ID", and "Detail Collection ID" are each index ID's referencing three separate elements in collection data structure 611. The relationships between each of the data structures and how fact-analyzer module 121 operates upon these data structures is described in further detail below.

Figure 8:
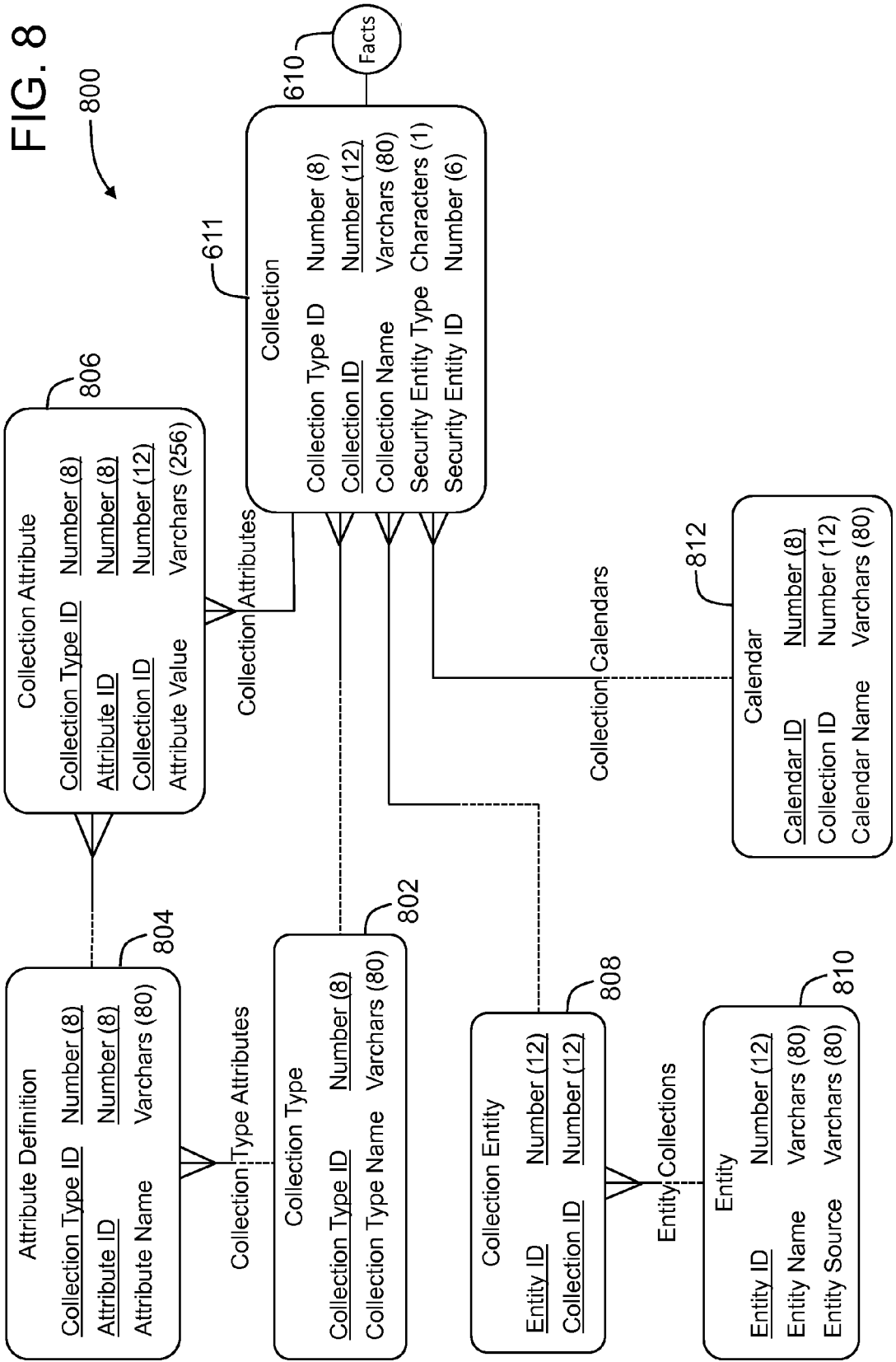

FIG. 8 is a detailed schematic block diagram of a "collection" subset of data structures 800 supporting collection data structure 611 shown in FIGS. 6 and 7. Components in FIG. 8, identical to components shown in FIG. 6, are identified using the same reference numerals as used in FIG. 6. Collection data structure 611 generally defines category attributes, or "collections", for the fact-data elements stored in fact data structure 610. For example, a particular fact-data element may be associated with a particular customer or user of system 112 (shown in FIG. 2). A collection-data element may be created identifying that particular customer. When a fact-data element is linked with that particular collection-data element, the fact-data element is thereby associated with that particular customer. In the example embodiment, the "POV Collection ID", i.e., "point of view" index ID linking from fact data structure 610 into collection data structure 611, is used for this purpose.

Further, a second collection-data element may be created identifying an additional categorization, such as a particular account or geography for that customer. The same fact-data element may also include a link to this second collection-data element, thereby additionally associating the fact-data element with this particular account or geography. In the example embodiment, the "Reporting Collection ID" is an index ID from fact data structure into the collection data structure 220 used for this purpose. In addition, further collection-data elements may be created to enable additional categorizations. In the example embodiment, a "Detail Collection ID" is defined in fact data structure 610, allowing fact-data elements to have a third collection type to which they may be associated. It should be understood that the types of categorizations described here are examples, and that other uses of this categorization technique may be employed while remaining within the scope of this disclosure. Further, a tiered relationship between the customer collection-data elements and the customer accounts or geographies collection-data elements may be implemented. However, it should be understood that a tiered relationship between collection-data elements is not necessary to practice the methods and systems as described herein.

The "collection" subset of data structures 800, in the example embodiment, also include collection type and attribute information associated with collections. A "Collection Type" data structure 802 stores elements defining the types of collections that are defined. For example, in the setting of payment card transactions, collection types may include "issuer", "app provider", "company", "issuer group", "company group", and "spending category." Each collection-data element stored in collection data structure 611 is linked to a single element in collection type data structure 802 using the "Collection Type ID" field in each respective table as the index ID. Two additional tables, an "Attribute Definition" data structure 804, and a "Collection Attribute" data structure 806, are also shown. This pair of tables allows for the recording of attributes of collections, and is configured in such a way as to allow many additional non-identifying pieces of data about the collection-data elements. They are associated with each other through the index ID's "Attribute ID", "Collection Type ID", and "Collection ID".

Additionally, in the example embodiment, the "collection" subset of data structures 800 also includes a pair of tables that define mapping of relationships between the collections. Within collection entity data structure 808, a plurality of collection entities are defined, and linked individually to an entity within an "Entity" data structure 810 using the "Entity ID" field as an index ID between the two tables.

The "collection" subset of data structures 800 also includes linkage to a "Calendar Name" data structure 812. The calendar data structure 812 elements may be associated with a particular collection-data element in collection data structure 611 using the "Collection ID" field in both tables. The calendar data structure 812 is discussed in greater detail below.

Figure 9:
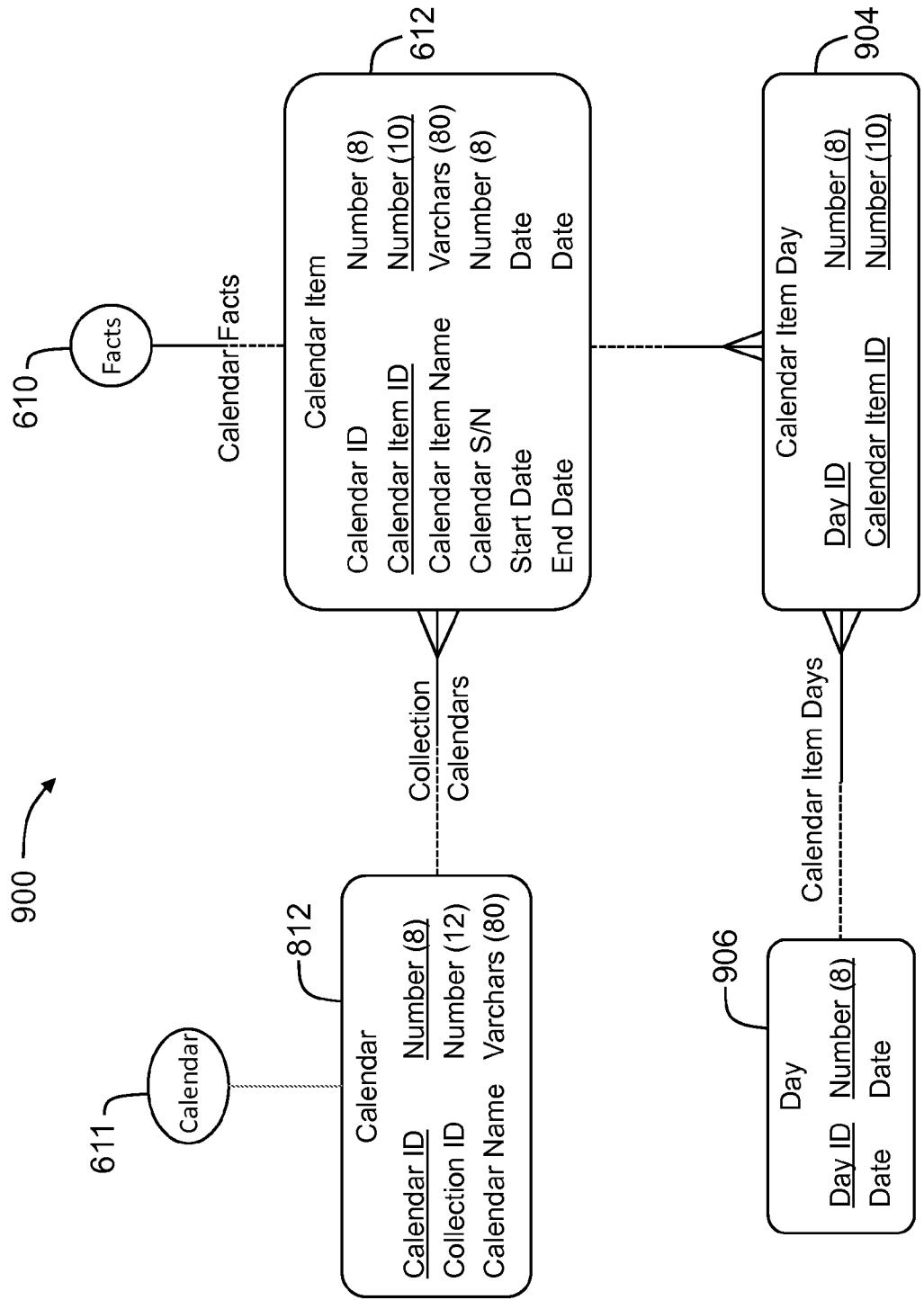

FIG. 9 is a detailed schematic block diagram of a "calendar" subset of data structures 900 supporting the calendar data structure 612 shown in FIGS. 6 and 7. Components in FIG. 9, identical to components shown in FIG. 6, are identified using the same reference numerals as used in FIG. 6. Calendar data structure 612 generally defines time periods associated with fact-data elements stored in fact data structure 610. For example, a particular fact-data element may be associated with the month of January, 2013. A calendar-data element may be created identifying that particular time period. When a fact-data element is linked with that particular calendar-data element, the fact-data element is thereby associated with that particular time period, i.e., the month of January, 2012. In the example embodiment, the "Calendar Item ID" field is an index ID used to link the fact-data elements of fact data structure 610 to the calendar-data elements of calendar data structure 612. Further, calendar data structure 612 includes fields "Start Date" and "End Date", which serve to define the applicable time period of any fact-data element associated with the particular calendar-data element. In the above example, the "Start Date" would be 00:00:00 Jan. 1, 2013, and the "End Date" would be 23:59:59 Jan. 31, 2013.

The "calendar" subset of data structures 900, in the example embodiment, further include a pair of tables used to store calendar day information. "Calendar Item Day" data structure 904 and "Day" data structure 906 store a list of days associated with each calendar-data element, thereby enabling system 100 (shown in FIG. 2) to record the composition of non-standard calendars and calendar items, such as those for which the day constituents of a time period cannot be determined by a normal system date function, for example, custom fiscal periods and accounting periods. These custom periods allow system 100 to correctly aggregate data for these custom periods of time. Also linking to calendar data structure 612 is calendar name data structure 812. Calendar name data structure 812 includes a "Calendar Name" field, along with links to both calendar data structure 612, through "Calendar ID" index ID, and to collection data structure 611, through "Collection ID" index ID.

Figure 10:
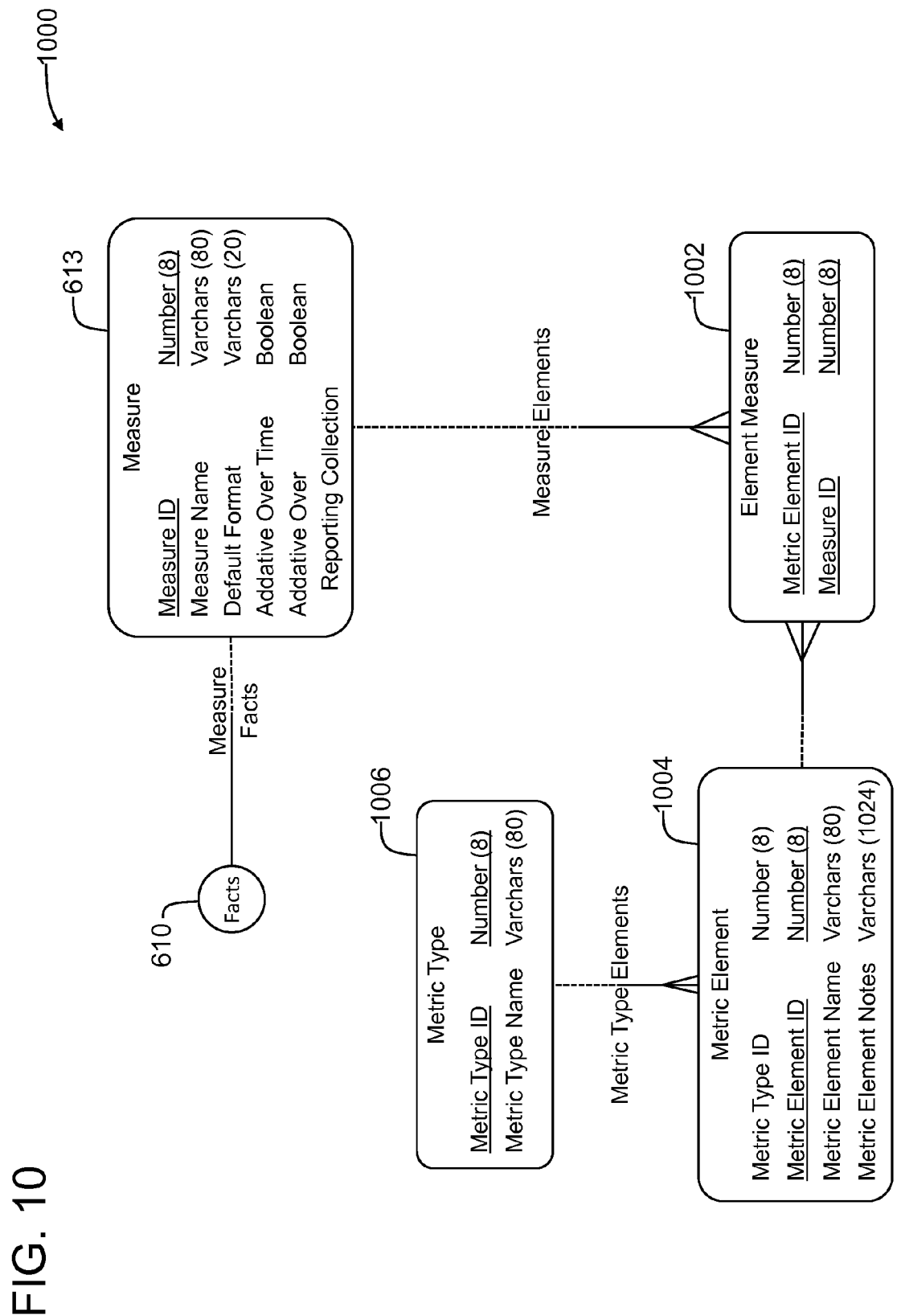

FIG. 10 is a detailed schematic block diagram of a "measure" subset of data structures 1000 supporting the measure data structure 613 shown in FIGS. 6 and 7. Components in FIG. 10, identical to components shown in FIG. 6, are identified using the same reference numerals as used in FIG. 6. Measure data structure 613 generally defines parameters associated with the calculation of aggregated values. For example, a particular fact-data element with an aggregated value may be associated with a particular measure-data element that further defines what particular combinations of parameters were used to compute the aggregated value. A measure-data element may be created identifying a particular combination of parameters. When the fact-data element is linked with that particular measure-data element, the fact-data element is thereby associated with that particular combination of parameters. In the example embodiment, the "Measure ID" field is an index ID used to link the fact-data elements of fact data structure 610 to the measure-data elements of measure data structure 613.

Measure data structure 613 also includes a "Measure Name" which, in the exemplary embodiment, is a unique, human-readable designation used to identify a measure during development of the query, as well as to identify the meaning of each value returned by the analysis. A "Default Format" is optionally used to contain a template for the presentation of the data returned for the measure, signifying formatting information such as whether the number should be shown as an integer, a percentage, or a currency value.

Measure-data elements, in the example embodiment, are additionally linked to a plurality of "Element Measure" elements in an "Element Measure" data structure 1002. Each element measure represents a relationship between measure-data elements from measure data structure 613 and metric-element-data elements from a "Metric Element" data structure 1004. Each metric-element-data element includes a "Metric Element Name" and a "Metric Element Notes". Further, each metric-element-data element includes a link to a "Metric Type" in a "Metric Type" data structure 1006, as well as a link to one or more element-measure-data elements in element measure data structure 1002.

In operation, each measure-data element in measure data structure 613 will be some combination of one or more metric-element-data elements from metric element data structure 1004. For example, metric-type-data elements in metric type data structure 1006 store classifications of metric elements, such as, for example, "base measures", "data sources", and "aggregation time frames." Each measure-data element may require a "base measure", and optionally may include a "data source" and an "aggregation time frame." If the list of "base measures" in metric element data structure 1004 includes "Widget Count" and "Average Widget Weight", and the list of "data sources" is "Factory 1", "Factory 2", and "Warehouse", and the list of "aggregation time frames" is "Past 7 Days" and "Month-to-Date", then system 100 could have each of the permutations of these three metric elements 1004, such as:

| "base measure" | "data source" | "aggregation time frame" |
| --- | --- | --- |
| Widget Count, or | Factory 2, | Month-to-Date; |
| Average Widget Weight, | Warehouse, | Past 7 Days |

Metric element data structure 1004, and its mapping back to a relatively small number of elements, provides the user of system 100 with a way to segment the calculation of the facts so that any number of calculations may be performed in a single pass. The user may identify different aggregation strategies for discrete collections of measures such that all measures having the same aggregation rules can be calculated in a single pass, rather than having to calculate aggregations for each measure individually. This approach presents a great time savings when calculating values for facts data structure 610.

The various example embodiments of collection data, calendar data, and measure data shown in FIGS. 6-10 represent an example embodiment of data structures that separate data into multiple tables. This separation adds some benefits to the overall system, including de-duplication of data, i.e., minimizing the number of times data values are repeated, thereby minimizing the total size of collection data structure 611, calendar data structure 612, and measure data structure 613, and increasing some transaction speeds when utilizing these tables. It should be understood, however, that other variations on these structures are possible, and within the scope of this disclosure, including, for example, having only a single collection table, a single calendar table, and a single measure table, each containing the substantive content of their illustrated and respective sub-tables.

In the example embodiment, each of the tables shown in FIGS. 7-10 are stored inside a single schema managed by a single instance of an RDBMS. Some of the functionality disclosed herein requires that certain of these tables be managed by a single RDBMS, while with other functionality it is possible to have multiple RDBMS instances managing different tables. It should be understood that any combination of table management using one or more RDBMS's that enables operation of the methods and systems as described herein may be used.

FIG. 11 is a flow diagram of a method 1100 for calculating and retrieving analytic data using the server system 112 shown in FIG. 2 and the data structures shown in FIGS. 6-10. In the example embodiment, method 1100 is executed at least in part by fact-analyzer module 121 (shown in FIG. 2) utilizing server system 112 (shown in FIG. 2) and database server 116 (shown in FIG. 2). Method 1100 includes storing 1110 one or more measure-data elements in measure data structure 613. Method 1100 further includes storing 1112 one or more calendar-data elements in calendar data structure 612. Method 1100 also includes storing 1114 one or more collection-data elements in collection data structure 611.

Method 1100, in the example embodiment, then calculates 1116 an aggregated value on transaction database 601 (shown in FIG. 6) utilizing at least one measure-data element, one calendar-data element, and one or more collection-data elements. More specifically, a measure-data element is used to define metric parameters associated with the calculation, a calendar-data element is used to define a time range associated with the calculation, and one or more collection-data elements are used to define the scope and categorization of the calculation. Method 1100 then stores 1118 the aggregated value and links to the measure-data element, calendar-data element, and collection data element(s) used to create the aggregated value, in a fact-data element within fact data structure 610.

In the example embodiment, before calculating 1116 an aggregated value, a fact-data element would be stored in the fact data structure 610. This fact-data element would identify the associated measure-data element, calendar-data element, and collection-data element(s) to be used when calculating 1116 the aggregated value. Further, the aggregated result would be stored 1118 in the same fact-data element that was used to create the calculation. Further, in some embodiments, the storing of a new fact-data element thereby defines and enables a new aggregate value calculation. In other embodiments, new aggregate value calculations are enabled by storing new elements in one of measure data structure 613, calendar data structure 612, and collection data structure 611.

When a user requests result data, method 1100 receives 1120 a request for one or more aggregated values from the user. In the example embodiment, the request comes from a user of server system 112 (shown in FIG. 2), such as an issuer or an acquirer client system 114 (shown in FIG. 2). The request is formed into an SQL query, as discussed in further detail below.

Based on the request, method 1100 then identifies 1122 one or more fact-data elements within fact data structure 610. In some embodiments, the fact-data elements may be further aggregated based on the request. In other embodiments, each of the one or more aggregated values from the one or more fact-data elements may be returned individually. Method 1100 outputs 1124 the aggregated value(s) requested.

In the example embodiment, identifying 1122 one or more non-aggregated fact-data elements, i.e., where no further computation on the individual fact-data elements is necessary to provide the user with the desired result, involves identifying these elements based on their associated measure-data element, calendar-data element, and one or more collection-data elements relative to the request. However, identifying 1122 an aggregation of fact-data elements (i.e., where some combination of several fact-data elements is necessary to provide the user with the desired result) involves a cross-table operation that leverages the structures of each of the described database tables, as well as operations commonly found in relational database management systems. For example, a user represented by the "Collection ID"=99 who wishes to retrieve a complete list of the transaction counts and login counts for all of the issuers he is allowed to see for the month of August 2012 may run the following query:

```
SELECT
    collection.collection_name,
    SUM(DECODE(measure.measure_name, 'Transaction Count',
    fact.measure_value, 0)),
    SUM(DECODE(measure.measure_name, 'Login Count',
    fact.measure_value, 0))
FROM
    fact
    JOIN collection ON (fact.reporting_collection_id =
    collection.collection_id)
    JOIN measure ON (fact.measure_id = measure.measure_id)
WHERE
    fact.calendar_item_id IN (SELET calendar_item_id FROM
    calendar_item WHERE calendar_item_name = "August 2012")
    AND fact.pov_collection_id = 99
    AND collection.collection_type_id IN
    (SELECT collection_type_id
    FROM collection_type WHERE collection_type_name = 'Issuer')
GROUP BY
    collection.collection_name;
```

The aggregation function in this example is performed by the "SUM" operation. Alternatively, other aggregation functions such as COUNT and AVG may be used. A conditional flow operation in this example is performed by the "DECODE" operation. Alternatively, other conditional flow operations such as CASE may be used.

More generally, during identification 1122 of fact-data elements in the example embodiment, a "point of view" (POV) filter may be used to prevent retrieval of duplicate information, and to assure that the data fetched pertains to the user making the request. For example, a WHERE clause such as the following may be used:

WHERE fact.pov_collection_id=<a collection id previously retrieved to represent the identity of the user making the request>

Further, a "subject area" filter may be used to limit the calculated facts retrieved to a set of one or more "reporting collections". For example, a WHERE clause such as the following may be used:

WHERE . . . AND fact.reporting_collection_id IN (<some sub-query or expression identifying which reporting collections are in the scope of analysis>)

Additionally, a "time filter" may be used to on the calendar item to define the time scope of the analysis, and to prevent retrieval of duplicate information, such as from the unintended addition of daily totals to monthly totals. For example, a WHERE clause such as the following may be used:

WHERE . . . AND fact.calendar_item_id IN (<some sub-query or expression identifying which calendar items are in the scope of analysis>)

Method 1100, in the example embodiment, further includes steps for updating an already-existing fact-data element. Some fact-data elements may be temporal, such as when a fact-data element is based on a period of time relative to the current time. For example, an aggregated value involving a customer's current monthly totals, or prior 30 days totals, will periodically go stale and require recalculation. Server system 112 already has the necessary elements required to form a calculation and create an updated result, i.e., the existing fact-data element has links to the measure-date element, calendar-data element, and collection-data element(s) used to calculate the previous aggregated value. Method 1100 then calculates 1130 an updated aggregated value using the same steps described above, and stores 1132 the updated aggregated value in the same fact-data element used during the calculation. In some embodiments, calculating 1130 an updated aggregated value may involve merging calculation results into a fact-data element. In other embodiments, calculating 1130 an updated aggregated value may involve deleting the prior value and inserting the newly calculated value.

As will be appreciated based on the foregoing specification, the above-described embodiments of the disclosure may be implemented using computer programming or engineering techniques including computer software, firmware, hardware or any combination or subset thereof, wherein the technical effect is a flexible system for configuring, calculating, storing, and retrieving aggregated values associated with a transaction database. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The above-described embodiments of methods and systems for calculating and retrieving analytic data provide a significant retrieval speed increase over prior known methods, utilizing built-in functions of traditional relational databases. The data tables are structured for flexibility, allowing a variety of measure metrics, calendar time periods, and collection categorizations to be stored and implemented to serve multiple customers using a shared database infrastructure. Pre-computation and storing of particular aggregation values allows the system to merely look up a value when requested by a user. Further combinations of aggregated values based on various attributes may be accomplished efficiently using native database tools. Further, by storing data associated with calculations of the aggregated values, values may be easily re-calculated as needed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A data management system for calculating and retrieving analytic data includes a computing device coupled to a database including transaction data, the data management system comprising:
  a measure data structure within the database comprising a measure-data element;
  a collection data structure within the database comprising a collection-data element;
  a fact data structure within the database configured to store a fact-data element, wherein the fact-data element includes an aggregated value, a link to the measure-data element, a link to the collection-data element, a point of view collection identifier identifying a user requesting a calculation associated with each fact-data element, and a reporting collection identifier identifying a particular account associated with each fact-data element; and
  a fact-analyzer module configured to:
    generate the aggregated value from the transaction data utilizing at least the measure-data element and the collection-data element, wherein the measure-data element defines how the aggregated value is calculated and the collection-data element defines a categorization of the aggregated value;
    identify a subject area filter identifying a scope of analysis;
    filter the aggregated value based on the subject area filter and the collection data element;
    store the aggregated value and links to the measure-data element and the collection-data element in the fact-data element;
    receive, from a user, a request for the aggregated value after storing the fact-data element, wherein receiving a request for the aggregated value includes i) identifying the fact-data element using at least the measure-data element and the collection-data element and ii) using a database cross-table operation including a join operation and a decode operation, such that each of the fact data structure, measure data structure, and collection data structure are referenced during the request, and wherein a point of view filter is used during identification of the fact-data element to prevent retrieval of duplicate information and to assure that the aggregated value pertains to the user making the request;
    identify the aggregated value from the fact data structure based at least in part on the request; and
    output the aggregated value.

2. The system in accordance with claim 1, wherein the fact-analyzer module further configured to:
recalculate the aggregated value after the aggregated value becomes stale, wherein a stale aggregated value is determined based on at least one of an elapsed amount of time, a fixed point in time, and a user input; and
store the recalculated aggregated value in the fact-data element.

3. The system in accordance with claim 1, wherein the fact-analyzer module is further configured to store at least one of an additional fact-data element, an additional measure-data element, and an additional collection-data element to the database.

4. The system in accordance with claim 1, wherein generating an aggregated value further utilizes another collection-data element from the collection data structure to define an additional categorization of the aggregated value.

5. The system in accordance with claim 1, wherein the collection data structure includes a collection type, a collection identifier, a collection name, a collection attribute, and a collection entity.

6. The system in accordance with claim 1, wherein the measure data structure includes a measure name, a measure identifier, a metric type, and a metric element.

7. The system in accordance with claim 1, further comprising:
a calendar data structure within the database comprising a calendar-data element,
wherein the aggregated value further includes a link to the calendar-data element,
wherein the fact-analyzer module is further configured to generate the aggregated value using the calendar-data element, wherein the calendar-data element defines the time range over which the aggregated value is calculated.

8. The system in accordance with claim 7, wherein the calendar data structure includes a calendar identifier, a calendar item identifier, a calendar item name, a start date, and an end date.

9. A method of calculating and retrieving analytic data stored within a computing device in communication with a database, the method comprising the steps of:
storing a measure-data element in a measure data structure within the database;
storing a collection-data element in a collection data structure within the database;
calculating an aggregated value from the database based at least in part on the measure-data element and the collection-data element, wherein the measure-data element defines how the aggregated value is calculated and the collection-data element defines a categorization of the aggregated value;
identifying a subject area filter identifying a scope of analysis;
filtering the aggregated value based on the subject area filter and the collection data element;
storing the aggregated value and links to the measure-data element and the collection-data element in a fact-data element of a fact data structure, wherein the fact-data element includes the aggregated value, a link to the measure-data element, a link to the collection-data element, a point of view collection identifier identifying a user requesting a calculation associated with each fact-data element, and a reporting collection identifier identifying a particular account associated with each fact-data element;
receiving a request identifying the fact-data element from the fact data structure after storing the fact-data element, wherein receiving a request identifying the fact-data element comprises i) identifying the fact-data element using at least the measure-data element and the collection-data element and ii) using a database cross-table operation having a join operation and a decode operation, such that each of the fact data structure, measure data structure, and collection data structure are each referenced during the request, and wherein a point of view filter is used during identification of the fact-data element to prevent retrieval of duplicate information and to assure that the aggregated value pertains to the user making the request; and
outputting the aggregated value from the fact-data element.

10. The method in accordance with claim 9, the method further comprising the steps of:
recalculating the aggregated value after the aggregated value becomes stale, wherein a stale aggregated value is determined based on at least one of an elapsed amount of time, a fixed point in time, and a user input; and
storing the recalculated aggregated value in the fact-data element.

11. The method in accordance with claim 9, the method further comprising the step of storing at least one of an additional fact-data element, an additional measure-data element, and an additional collection-data element to the database.

12. The method in accordance with claim 9, wherein calculating an aggregated value further includes utilizing another collection-data element from the collection data structure to define an additional categorization of the aggregated value.

13. The method in accordance with claim 9, wherein storing a collection-data element includes storing a collection type, a collection identifier, a collection name, a collection attribute, and a collection entity.

14. The method in accordance with claim 9, wherein storing a measure-data element includes storing a measure name, a measure identifier, a metric type, and a metric element.

15. The method in accordance with claim 9, the method further comprising:
storing a calendar-data element in a calendar data structure within the database,
wherein calculating an aggregated value is based at least in part on the calendar-data element, wherein the calendar-data element defines a time range for the calculation,
wherein storing the aggregated value and links includes storing a link to the calendar-data element in the aggregated value.

16. The method in accordance with claim 15, wherein storing a calendar-data element includes storing a calendar identifier, a calendar item identifier, a calendar item name, a start date, and an end date.

17. Computer-readable storage media having computer-executable instructions embodied thereon, wherein, when executed by at least one processor, the computer-executable instructions cause the processor to:
store a measure-data element in a measure data structure within a database;
store a collection-data element in a collection data structure within the database;

calculate an aggregated value from the database based at least in part on the measure-data element and the collection-data element, wherein the measure-data element defines how the aggregated value is calculated and the collection-data element defines a categorization of the aggregated value;

identify a subject area filter identifying a scope of analysis;

filter the aggregated value based on the subject area filter and the collection data element; and store the aggregated value and links to the measure-data element and the collection-data element in a fact-data element of a fact data structure, wherein the fact-data element includes the aggregated value, a link to the measure-data element, a link to the collection-data element, a point of view collection identifier identifying a user requesting a calculation associated with each fact-data element, and a reporting collection identifier identifying a particular account associated with each fact-data element;

receive a request identifying the fact-data element from the fact data structure after storing the fact-data element, wherein receiving a request includes i) identifying the fact-data element using at least the measure-data element and the collection-data element and ii) using a database cross-table operation including a join operation and a decode operation, such that each of the fact data structure, measure data structure, and collection data structure are each referenced during the request, and wherein a point of view filter is used during identification of the fact-data element to prevent retrieval of duplicate information and to assure that the aggregated value pertains to the user making the request; and output the aggregated value from the fact-data element.

18. The computer-readable storage media in accordance with claim 17, wherein the computer-executable instructions cause the processor to:

store a calendar-data element in a calendar data structure within the database, wherein calculating an aggregated value is based at least in part on the calendar-data element, wherein the calendar-data element defines a time range for the calculation, wherein storing the aggregated value and links includes storing a link to the calendar-data element in the fact-data element.

19. The computer-readable storage media in accordance with claim 18, wherein identifying the fact-data element comprises identifying the fact-data element using the calendar-data element.

20. The computer-readable storage media in accordance with claim 19, wherein using a database cross-table operation comprises using a database cross-table operation such that the calendar data structure is referenced during the request.

* * * * *